US012266369B2

(12) United States Patent
Kawai

(10) Patent No.: US 12,266,369 B2
(45) Date of Patent: Apr. 1, 2025

(54) AI CONTROL DEVICE, SERVER DEVICE CONNECTED TO AI CONTROL DEVICE, AND AI CONTROL METHOD

(71) Applicant: TOA Corporation, Kobe (JP)

(72) Inventor: Yuma Kawai, Hyogo (JP)

(73) Assignee: TOA Corporation, Kobe (JP)

( * ) Notice: Subject to any disclaimer, the term of this patent is extended or adjusted under 35 U.S.C. 154(b) by 374 days.

(21) Appl. No.: 17/911,218

(22) PCT Filed: Mar. 19, 2020

(86) PCT No.: PCT/JP2020/012393
§ 371 (c)(1),
(2) Date: Sep. 13, 2022

(87) PCT Pub. No.: WO2021/186692
PCT Pub. Date: Sep. 23, 2021

(65) Prior Publication Data
US 2023/0095124 A1     Mar. 30, 2023

(51) Int. Cl.
*G10L 17/04*     (2013.01)
*G06Q 30/0283*   (2023.01)
*G10L 17/26*     (2013.01)

(52) U.S. Cl.
CPC .......... *G10L 17/04* (2013.01); *G06Q 30/0283* (2013.01); *G10L 17/26* (2013.01)

(58) Field of Classification Search
CPC ......... G10L 17/04; G10L 17/18; G10L 17/22; G10L 17/26

(Continued)

(56) References Cited

U.S. PATENT DOCUMENTS

2015/0170049 A1   6/2015 Mann et al.
2018/0276569 A1   9/2018 Oguri
(Continued)

FOREIGN PATENT DOCUMENTS

CN   109074521 A   12/2018
EP   3557846 A1   10/2019
(Continued)

OTHER PUBLICATIONS

International Search Report of International Application No. PCT/JP2020/012393, mailed on Jul. 28, 2020, 3 pages.
(Continued)

*Primary Examiner* — Qi Han
(74) *Attorney, Agent, or Firm* — United IP Counselors, LLC

(57) ABSTRACT

An AI control device, which identifies individual users from a plurality of users to receive input data, and is connectable to a server device that generates a trained model based on input data for each user, includes a control unit, and a communication unit connected to the server device. The control unit acquires input data, associates acquired input data and identifying information used to identify the user of the AI control device, and sends the data and information to the server device via the communication unit. The control unit uses the sent acquired input data to execute a trained model that is generated separately from trained models of other users by the server device, and that learns characteristics of acquired input data and detects input data having the same characteristics from unknown input data.

8 Claims, 10 Drawing Sheets

(58) Field of Classification Search
USPC ........ 704/246, 245, 250, 251, 254, 255, 257
See application file for complete search history.

(56) References Cited

U.S. PATENT DOCUMENTS

| | | |
|---|---|---|
| 2018/0349633 A1 | 12/2018 | Takimoto |
| 2019/0050683 A1* | 2/2019 | Gupta Hyde ...... G06V 10/7747 |
| 2019/0103185 A1 | 4/2019 | Kudo |
| 2019/0147361 A1 | 5/2019 | Matsumoto et al. |
| 2019/0259378 A1 | 8/2019 | Khadloya et al. |
| 2020/0195652 A1* | 6/2020 | Carnahan .............. H04L 63/205 |

FOREIGN PATENT DOCUMENTS

| | | |
|---|---|---|
| EP | 3579153 A1 | 12/2019 |
| JP | 2017-142739 A | 8/2017 |
| JP | 2019-067026 A | 4/2019 |
| JP | 6527187 B2 | 6/2019 |
| WO | 2017/138406 A1 | 8/2017 |
| WO | 2018/142766 A1 | 8/2018 |
| WO | 2018/167607 A1 | 9/2018 |

OTHER PUBLICATIONS

Extended European Search Report issued in corresponding European Application No. 20925603.1-1203, dated Feb. 24, 2023.
Schneider et al., "Personalization of Deep Learning," ARXIV.ORG, Cornell University Library, Ithaca, New York, Sep. 2019, 8 pages.

* cited by examiner

| USER ID | LABEL | VOICE DATA | USABILITY INFORMATION |
|---------|-------|------------|------------------------|
| USER A | SCREAM | A000001~ A005001 | USABLE |
| USER B | WOMAN'S SCREAM | B000001~ B113555 | NOT USABLE |
| USER C | OUTDOOR SCREAM | C000001~ C106873 | NOT USABLE |
| USER D | SCREAM | C000001~ C192567 | USABLE |
| ⋮ | ⋮ | ⋮ | |

FIG. 4A

| MACHINE LEARNING USAGE FEE (PER LABEL) | FEE FOR USE BY OTHER USERS (PER LABEL) | FEE WHEN NOT USABLE BY OTHER USERS |
|---|---|---|
| 100 YEN | 50 YEN | −50 YEN |

FIG. 4B

WHAT KIND OF SENSOR WILL YOU GENERATE?

| LABEL 1 | WOMAN'S SCREAM |
|---|---|
| LABEL 2 | |

ADD LABEL

ALLOW USE OF VOICE DATA BY OTHER USER?

YES    NO

FIG. 7

THERE ARE 25 LABELS IN DATA OF OTHER USER RELATING TO YOUR REQUESTED LEARNING. USE THESE LABELS?

| DEGREE OF RELEVANCE | 100% |
|---|---|

LABEL: WOMAN'S SCREAM

NUMBER OF SAMPLES:85

YES    NO

| DEGREE OF RELEVANCE | 80% |
|---|---|

LABEL: SCREAM

NUMBER OF SAMPLES:120

YES    NO

▷

☐ START MACHINE LEARNING WITHOUT USING ANY DATA

| MICROPHONE-IDENTIFYING INFORMATION | POSITION | MICROPHONE IP ADDRESS |
|---|---|---|
| 50-0001 | a0001 | ************0001 |
| 50-0002 | a0002 | ************0010 |
| ⋮ | ⋮ | ⋮ |

| SPEAKER-IDENTIFYING INFORMATION | POSITION | SPEAKER IP ADDRESS |
|---|---|---|
| 20-0001 | a0001 | ************0001 |
| 20-0002 | a0002 | ************0010 |
| ⋮ | ⋮ | ⋮ |

FIG. 11B

| SURVEILLANCE-CAMERA-IDENTIFYING INFORMATION | POSITION | SURVEILLANCE CAMERA IP ADDRESS |
|---|---|---|
| 40-0001 | a0001 | ************0101 |
| 40-0002 | a0002 | ************0110 |
| ⋮ | ⋮ | ⋮ |

FIG. 11C

AI CONTROL DEVICE, SERVER DEVICE CONNECTED TO AI CONTROL DEVICE, AND AI CONTROL METHOD

This application is the U.S. National Phase of International Application No. PCT/JP2020/012393, filed Mar. 19, 2020. The contents of that application are incorporated by reference herein in their entirety

TECHNICAL FIELD

The present disclosure relates to an AI control device, a server device connected to the AI control device, and an AI control method.

BACKGROUND ART

Conventionally, trained-model-building devices and abnormality detection devices for performing abnormality detection using information regarding sounds heard around production devices are known (refer to JP6527187B). In JP6527187B, a trained model construction device acquires voice data including a voice of a worker positioned in the vicinity of a production device, acquires a degree of abnormality pertaining to a production line as a label, and performs supervised learning using a combination of the voice data and the label as training data, thereby building a trained model for degrees of abnormality. An abnormality detection device determines a degree of abnormality in determination data using the constructed trained model and determination data.

BRIEF SUMMARY

Obtaining sufficient training data to build a trained model is burdensome for a user, and it is difficult to improve accuracy of output obtained from a trained model.

An object of the present disclosure is to provide an AI control device, a server device connected to the AI control device, and an AI control method with which it is possible to reduce a burden on a user in generating a trained model and to realize a discretionary event detection means using the trained model.

According to an aspect of the present disclosure, the AI control device is an AI control device that identifies an individual user from a plurality of users to receive input data and that can be connected to a server device that generates a trained model on the basis of the input data for each user, wherein the AI control device comprises a first control unit and a first communication unit connected to the server device. The first control unit acquires input data, associates the acquired input data and identifying information with which the user of the AI control device can be identified, and sends the associated data and information to the server device via the first communication unit. The first control unit executes a trained model that is generated separately from trained models of other users by the server device using the sent acquired input data and that learns characteristics of the acquired input data to detect input data having the same characteristics from unknown input data.

According to another aspect of the present disclosure, the server device is a server device that can be connected to a plurality of AI control devices used by a plurality of users, wherein the server device comprises a second control unit, a second communication unit connected to the plurality of AI control devices, and a second storage unit. The second control unit receives input data associated with information that identifies the users from the AI control devices of the plurality of users via the second communication unit, stores the received input data in the second storage unit, and uses the received input data to learn characteristics of the received input data for each user and generate a trained model that detects input data having the same characteristics from unknown input data. The second control unit causes the second storage unit to store a generated trained model for each user According to yet another aspect of the present disclosure, the AI control method is an AI control method using a server device that can be connected to a plurality of AI control devices used by a plurality of users, wherein the AI control method includes receiving input data associated with identifying information of the plurality of users from the AI control devices of the users, storing the received input data in a storage unit, using received input data to learn characteristics of the received input data for each user, generating a trained model that detects input data having the same characteristics from unknown input data, and causing the storage unit to store a generated trained model for each user.

With the AI control device, the server device connected to the AI control device, and the AI control method according to the present disclosure, it is possible to reduce a burden on a user in generating a trained model and to realize a discretionary event detection means using the trained model.

BRIEF DESCRIPTION OF THE DRAWINGS

FIG. 4A shows an example of a user management table managed in a server device.

FIG. 4B shows an example of a charge table managed in a server device.

FIG. 7 shows one example of a display interface used by a user to input labels.

FIG. 8A shows one example of a display interface showing relevance information.

FIG. 11B shows an example of position information of a speaker referenced by an AI control device according to another embodiment.

FIG. 11C shows an example of position information of a surveillance camera referenced by an AI control device according to another embodiment.

DETAILED DESCRIPTION

1. Embodiment 1

Figure 1:
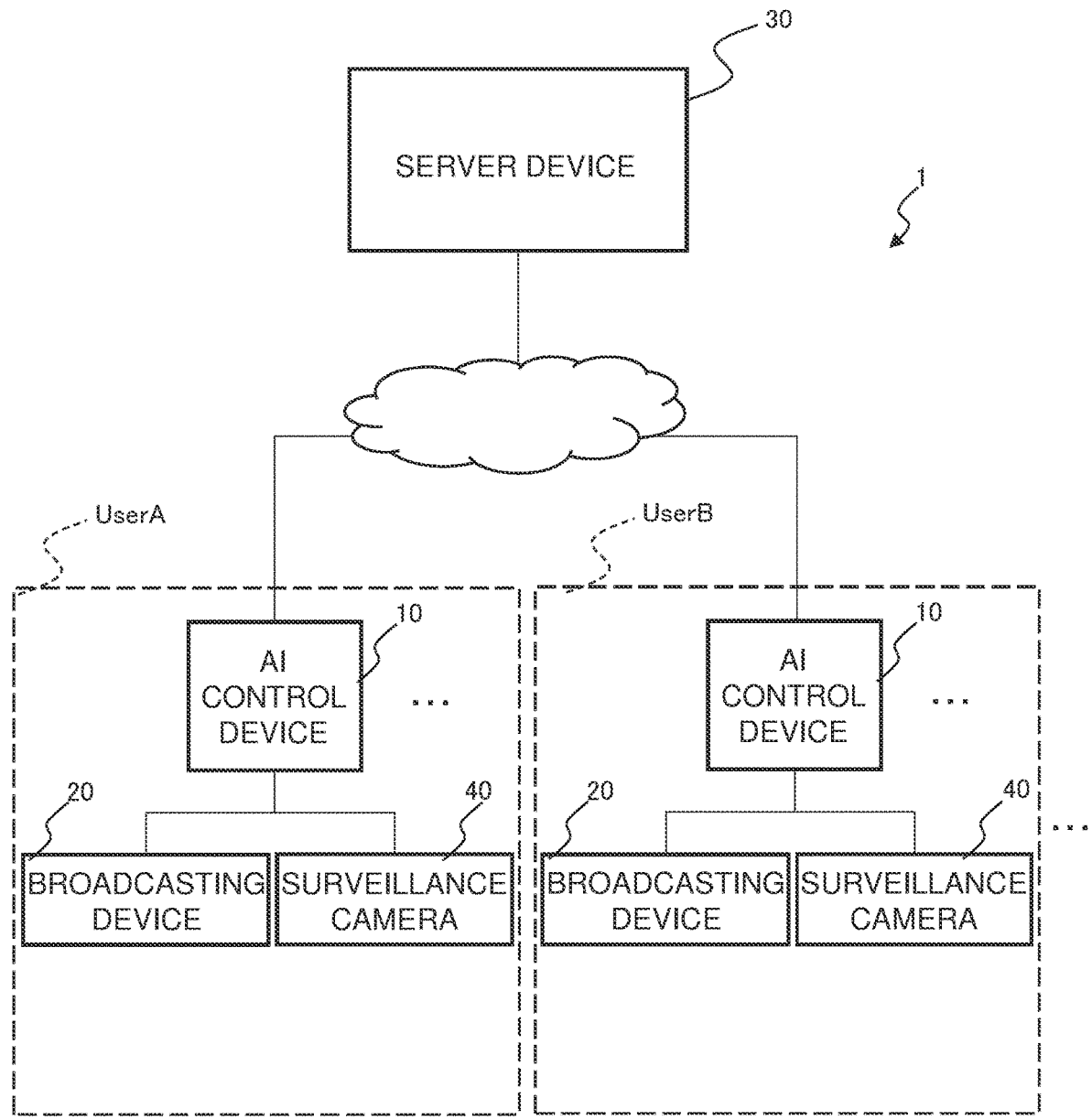
FIG. 1 shows an overall configuration of a system according to Embodiment 1.

A system 1 shown in FIG. 1, including AI control devices 10 and a server device 30, makes it possible to generate a sensor that responds to a discretionary event (abnormal sound, etc.) so as to suit each user. Through the AI control devices 10, which are used by users, the system collects input data with keywords as labels, the keywords representing events that the users want to elicit a reaction, e.g., abnormal sounds such as screams and doors opening/closing, and the system sends the input data to the server device 30. The server device 30 is a machine-learning server, and generates and manages a trained model for each user on the basis of input data received for each user. The AI control devices 10 function as sensors that react to sounds including unknown sounds when an event occurs, on the basis of the trained model. As a result, the users can generate sensors suitable for themselves.

The AI control devices 10 are devices used by users denoted as UserA, UserB, etc., as shown in FIG. 1. The AI control devices 10 are connected to equipment including broadcasting devices 20 and surveillance cameras 40 installed in offices, factories, commercial facilities, public facilities, and other facilities. One AI control device 10 may be connected to multiple pieces of equipment, or an AI control device 10 may be connected to each piece of equipment. The AI control devices 10 may also be set up as control devices within the equipment.

The pieces of equipment are each provided with a contact input terminal that receives a signal from an AI control device 10 as described hereinafter, and a relay circuit that causes equipment to operate in accordance with a signal received from the contact input terminal.

A broadcasting device 20 includes at least a contact input terminal, a holding unit that holds a broadcast voice, and a speaker. The broadcasting device 20 outputs the broadcast voice held in the holding unit from the speaker and amplifies the voice in accordance with the signal received from the contact input terminal.

A surveillance camera 40 includes at least a contact input terminal and a video-recording unit. The surveillance camera 40 records captured video in accordance with the signal received from the contact input terminal.

The configuration and actions of the system 1 including the AI control devices 10 and the server device 30 according to the present embodiment are described below.

In the description below, the input data is voice data in which a user labels a scream as a keyword, and a case in which a sensor that detects a scream as abnormality detection is used as an example.

1-1. Configuration 1-1-1. AI Control Device 10

Figure 2:
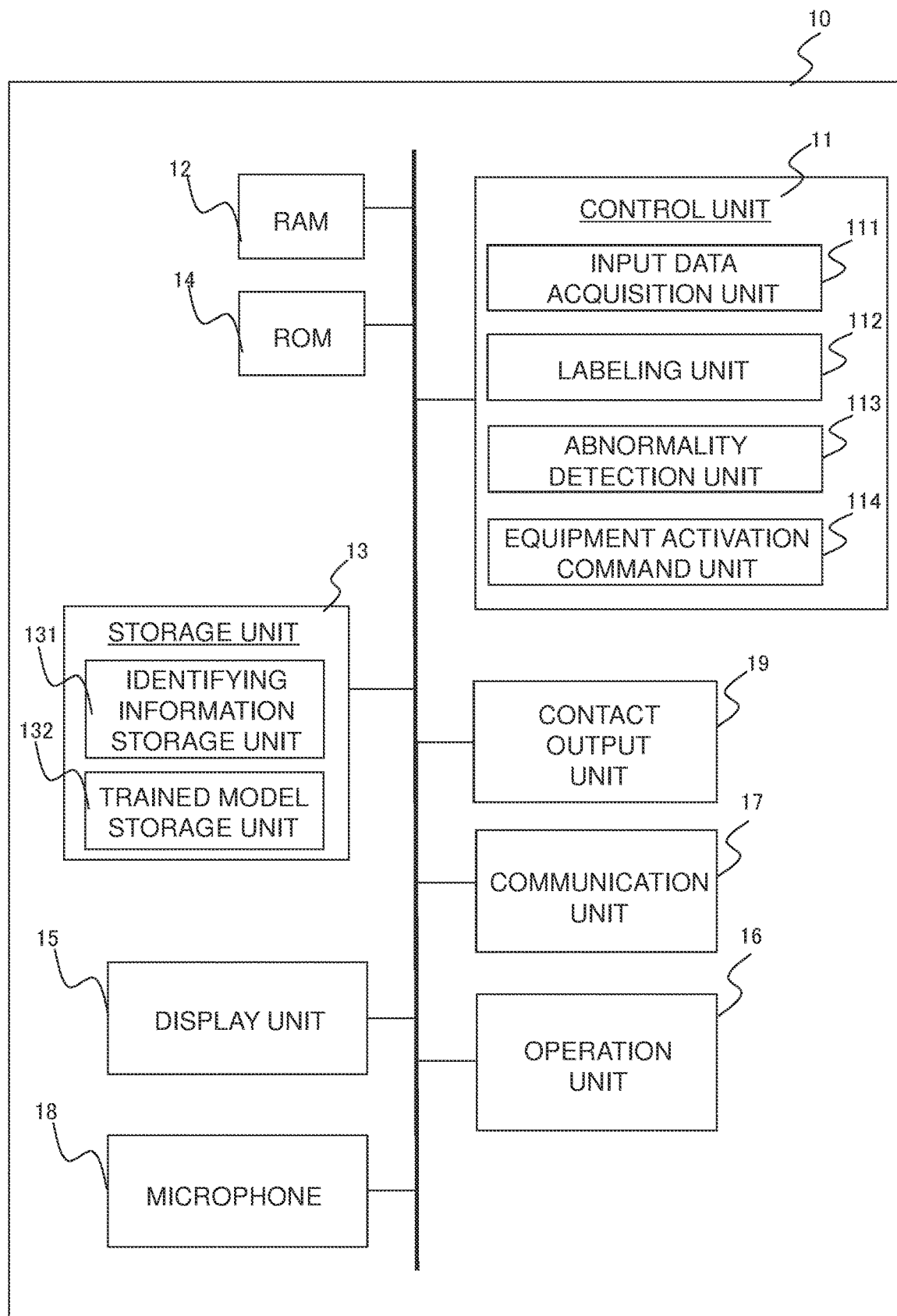
FIG. 2 shows a configuration of an AI control device according to Embodiment 1.

As shown in FIG. 2, an AI control device 10 (one example of an AI control device) is provided with a control unit 11, RAM 12, ROM 14, a storage unit 13, a display unit 15, an operation unit 16, a communication unit 17, a microphone 18, and a contact output unit 19.

The control unit 11 (one example of a first control unit) is configured from, e.g., an AI chip, and includes a CPU, a GPU, an FPGA, or another processor capable of high-speed processing. The control unit 11 executes functions of the AI control device 10 by reading out and executing, in the RAM 12, computer programs stored in the ROM 14 and/or the storage unit 13. The control unit 11 executes programs according to the trained model generated by the server device 30 to execute functions of an input data acquisition unit 111, a labeling unit 112, an abnormality detection unit 113, and an equipment activation command unit 114.

The microphone 18 (one example of an input unit) is an internal microphone built into the AI control device 10, or at least one external microphone (not shown) connected to the AI control device 10 via an XLR connector or another external input terminal. The microphone 18 is used in voice acquisition for input data (voice data) used in machine learning performed by a server 30 (described hereinafter), and/or voice acquisition for an abnormality detection action (described hereinafter). The microphone 18 may be a plurality of external microphones connected via different external input terminals. When the AI control device 10 is connected to multiple pieces of equipment, a plurality of external microphones 18 may be provided in association with the multiple pieces of equipment. For example, when multiple pieces of equipment are installed in different areas, the external microphones 18 may be connected to the AI control device 10 via external input terminals such that the different external microphones 18 are disposed in these areas together with the pieces of equipment.

The input data acquisition unit 111 acquires voice data inputted by a user. The voice data includes a plurality of sample sounds that a user judges to be "screams." The voice data is, for example, inputted through the microphone 18. For example, sample sounds are repeatedly inputted through the microphone 18 and given the same label by the labeling unit 112 (described hereinafter), whereby labeled voice data is acquired. Voice data may also be acquired from voice files previously acquired and stored in the storage unit 13. In addition, sample sounds collected through the microphone 18 may be temporarily stored in the storage unit 13, and the user may collectively assign the same label to the stored sample sounds.

The labeling unit 112 assigns a label to the voice data acquired by the input data acquisition unit 111. The assigning of labels is carried out in response to input by the user using a display interface (described hereinafter). Voice data assigned a label (referred to hereinafter as labeled voice data or labeled input data) is sent to the server device 30 via the communication unit 17.

The abnormality detection unit 113 acquires a voice picked up from the microphone 18 and determines abnormality on the basis of the trained model generated by the server device 30.

When an abnormality has been determined, the equipment activation command unit 114 generates a signal for operating the equipment (broadcasting device 20, surveillance camera 40, etc.) to which the AI control device 10 is connected. The generated signal is sent to the equipment via the contact output unit 19. By receiving the signal, a contact of a relay circuit in the equipment changes to ON and the equipment operates. For example, when the sound acquired from the microphone 18 is determined to be a "scream," the equipment is changed to ON, a broadcast voice (warning voice) is outputted if the equipment is the broadcasting device 20, and video recording is started if the equipment is the surveillance camera 40.

When the AI control device 10 is connected to multiple pieces of equipment in different areas, the equipment activation command unit 114 sends a signal from an output terminal connected to equipment close to the microphone 18 that acquired the voice determined to be abnormal (equipment corresponding to the microphone 18 and installed in the same area), and causes the equipment to operate.

The storage unit 13 is configured from a semiconductor memory, an HDD, etc. The storage unit 13 has an identifying information storage unit 131 that stores identifying information of the AI control device 10. The storage unit 13, as shall be described hereinafter, also has a trained model storage unit 132 (one example of a storage unit) that stores trained models including parameters and programs generated and updated by machine learning. Trained models are stored in the server device 30, and may simply be temporarily stored in the AI control device 10. In this case, the trained model storage unit 132 may be included in part of the control unit 11. In addition, part or all of the storage unit 13 may be provided as another storage device.

The display unit 15 is configured by, for example, a liquid crystal display or an organic EL display. The display unit 15 may include a touch panel. The display unit 15 may be a separate display that can be connected to the AI control device 10.

The operation unit 16 is provided with, for example, a keyboard, a mouse, a touch panel, etc., and is operated with input by a user in accordance with a screen image presented on the display unit 15.

The communication unit 17 (one example of a first communication unit) is an interface for connecting to a network, e.g., a network card that can be connected by wire or by an antenna for wireless communication. The communication unit 17 is connected to the server device 30 via the internet and a LAN, a WAN, or another internal network.

The contact output unit 19 (one example of an external interface) has an output terminal connected to the broadcasting device 20, the surveillance camera 40, or another piece of equipment, and sends the signal generated by the equipment activation command unit 114. The contact output unit 19 has a plurality of output terminals, and the AI control device 10 may be connected to a plurality of broadcasting devices 20 and a plurality of surveillance cameras 40 in different areas for each output terminal.

1-1-2. Server Device 30

The server device 30 is connected via the internet to the AI control devices 10 used by a plurality of users. The server device 30 is managed by a business operator who manages the equipment or a business operator who provides a service that uses machine learning.

Figure 3:
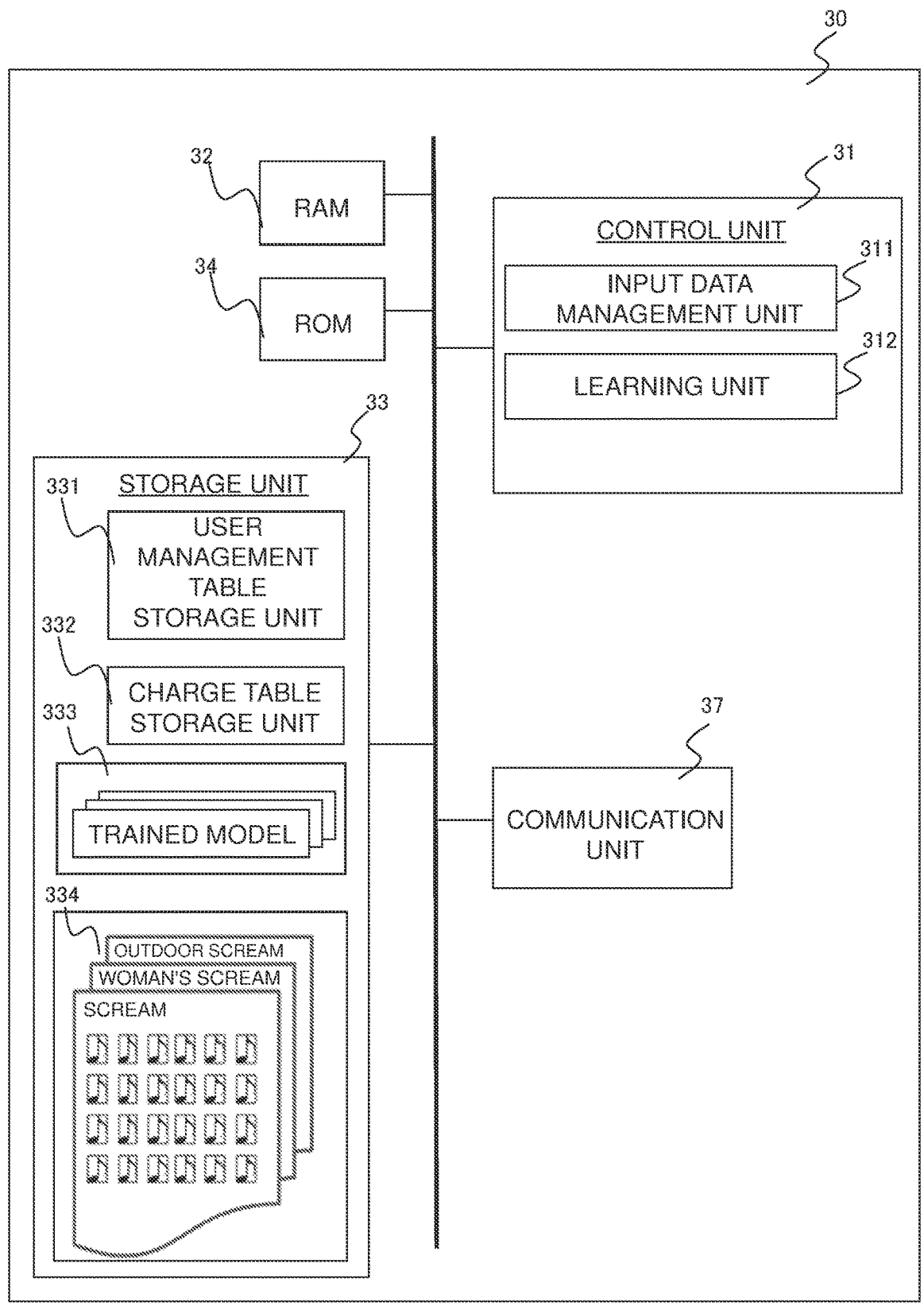
FIG. 3 shows a configuration of a server device according to Embodiment 1.

The server device 30 (one example of a server device) is provided with a control unit 31, RAM 32, ROM 34, a storage unit 33, and a communication unit 37, as shown in FIG. 3.

The control unit 31 (one example of a second control unit) is configured from, for example, an AI chip, and includes a CPU, a GPU, or another processor capable of high-speed processing. The control unit 31 executes functions of the server device 30 by reading out and executing, in the RAM 32, computer programs stored in the ROM 34 and/or the storage unit 33. The control unit 31 executes functions of an input data management unit 311 and a learning unit 312 in particular.

The input data management unit 311 stores voice data, which is input data acquired from the AI control devices 10 of the users, in the storage unit 33. At this time, the input data management unit 311 performs actions such as generating and updating a user management table (described hereinafter) in accordance with user-identifying information, labeled voice data, and usability information sent from the AI control devices 10 of the users. The input data management unit 311 furthermore refers to the user management table (described hereinafter) to send charge information to the AI control devices 10 in accordance with requests from the AI control devices 10.

Figures 8B, 9:
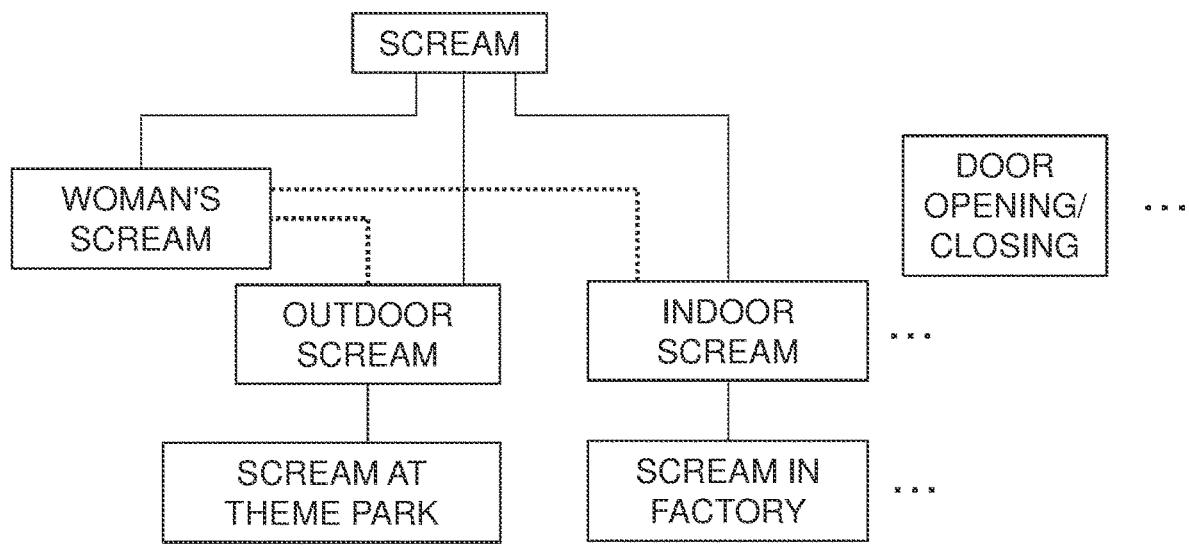
FIG. 8B shows an example of criteria information for calculating a degree of relevance of a label name.
FIG. 9 shows one example of a display interface showing charge information.

On the basis of labeled voice data acquired from the AI control devices 10 of the users, the input data management unit 311 generates and updates criterion information for determining similarity between label names. The criterion information is information associating label name concepts according to a predetermined criterion. The predetermined criterion is, for example, whether or not there is a relationship such that one label name concept (subordinate concept) succeeds another label name concept (superordinate concept), whether label name concepts are identical terms or synonyms, or another criterion. The input data management unit 311 generates criterion information represented by, for example, a hierarchical structure such as is shown in FIG. 8B, and stores the criterion information in the storage unit 33. When labeled voice data is acquired from an AI control device 10 of a user, the input data management unit 311 updates the criterion information if, for example, a new label name has been assigned.

The input data management unit 311 generates degree of relevance information in response to a request from an AI control device 10 of a user. The degree of relevance information includes labeled voice data having a high degree of relevance to the labeled voice data of interest, and a degree of relevance between these two pieces of data. The input data management unit 311 refers to the criterion information described above to calculate the degree of relevance. For example, as shown in FIGS. 8A and 8B, with voice data assigned the label name "woman's scream," the degree of relevance of voice data assigned the identical label name "woman's scream" (or woman's cry, etc.) is calculated to be 100%. In addition, with, for example, voice data assigned the label name "woman's scream," the degree of relevance of voice data assigned the label name "scream" is calculated to be 80%. On the other hand, with, for example, voice data assigned the label name "door opening/closing," the degree of relevance of voice data assigned the label name "scream" is calculated to be 0%. The input data management unit 311 reads out, through an input data storage unit 334, voice data having a comparatively high (e.g., 60% or higher) degree of relevance thus calculated, and generates degree of relevance information that includes the degree of relevance and that is to be sent to the AI control device 10 that had the request.

In response to requests from the AI control devices 10, the learning unit 312 performs machine learning on the basis of acquired voice data and constructs a trained model for each user. Specifically, the learning unit 312 constructs a trained model that autonomously learns characteristics of acquired voice data and detects voices having the same characteristics in the input of unknown sound.

Machine learning is, for example, performed using a regression algorithm that classifies supervised learning, or performed using a deep learning neural network. Machine learning executes "supervised learning." The labeled voice data is used in machine learning as correct answer data. In addition, previously prepared incorrect answer data (for example, voice data that is not a "scream" in relation to labeled voice data that is a "scream") may be used in machine learning.

The server device 30 may use an existing AI platform, machine learning engine, or other machine learning service to perform training using labeled voice data with an existing trained model, and may execute machine learning.

The storage unit 33 (one example of a second storage unit or a storage unit) is configured by a semiconductor memory, an HDD, etc. The storage unit 33 includes a user management table storage unit 331, a charge table storage unit 332, a trained model storage unit 333 stored for each user, and an input data storage unit 334 in which voice data is stored by label. Part or all of the storage unit 33 may be provided as a separate storage device including a database.

The user management table storage unit 331 stores a user management table 331a such as is shown in FIG. 4A. The user management table 331a stores identifying information of users, labels, identifying information of voice data corresponding to the labels, and usability information in association with each other. Usability information indicates whether or not to allow the voice data to be used by other users. The usability information may allow or disallow only one specific user. For example, the usability information may specify a rival company and enable a disallowance to be set.

The charge table storage unit 332 stores a charge table 332a such as is shown in FIG. 4B. The charge table 332a is a table for the AI control device 10 to calculate a usage fee for when a trained model is generated by the server device 30, and charge the user of the AI control device 10. For example, the charge table 332a is information indicating a unit price for generating a trained model. For example, the charge table 332a includes a basic usage fee (100 yen in the example of FIG. 4B) for machine learning using labeled voice data assigned one label, an additional fee (50 yen in the example of FIG. 4B) for using labeled voice data of another user during machine learning, and an additional expense (−50 yen, i.e., a discount of 50 yen in the example of FIG. 4B) for when the usability information of the labeled voice data is "allow" (affirmative usability information).

The trained model storage unit 333 stores a trained model generated by the learning unit 312 for each user.

The input data storage unit 334 stores voice data by label. Labeled voice data acquired from the users is classified by label and stored in the input data storage unit 334 by the input data management unit 311. The classification of voice data by label may be performed according to the criterion information described above. For example, in the case of the label name "scream," voice data of the superordinate concept "scream" is classified so as to include voice data assigned the label names "woman's scream," "outdoor scream," and "indoor scream," which are subordinate concepts, as shown in FIG. 8B.

The communication unit 37 (one example of a second communication unit) is an interface for connecting to a network, e.g., a network card that can be connected by wire or by an antenna for wireless communication. The communication unit 37 is connected to the AI control devices 10 of a plurality of users via the internet and a LAN, a WAN, or another internal network.

1-2. Actions

The actions of an AI control device 10 (FIG. 2) and a server device 30 shall be described with reference to FIGS. 5-10.

1-2-1. Actions for Machine Learning Performed by AI Control Device 10

Figure 5:
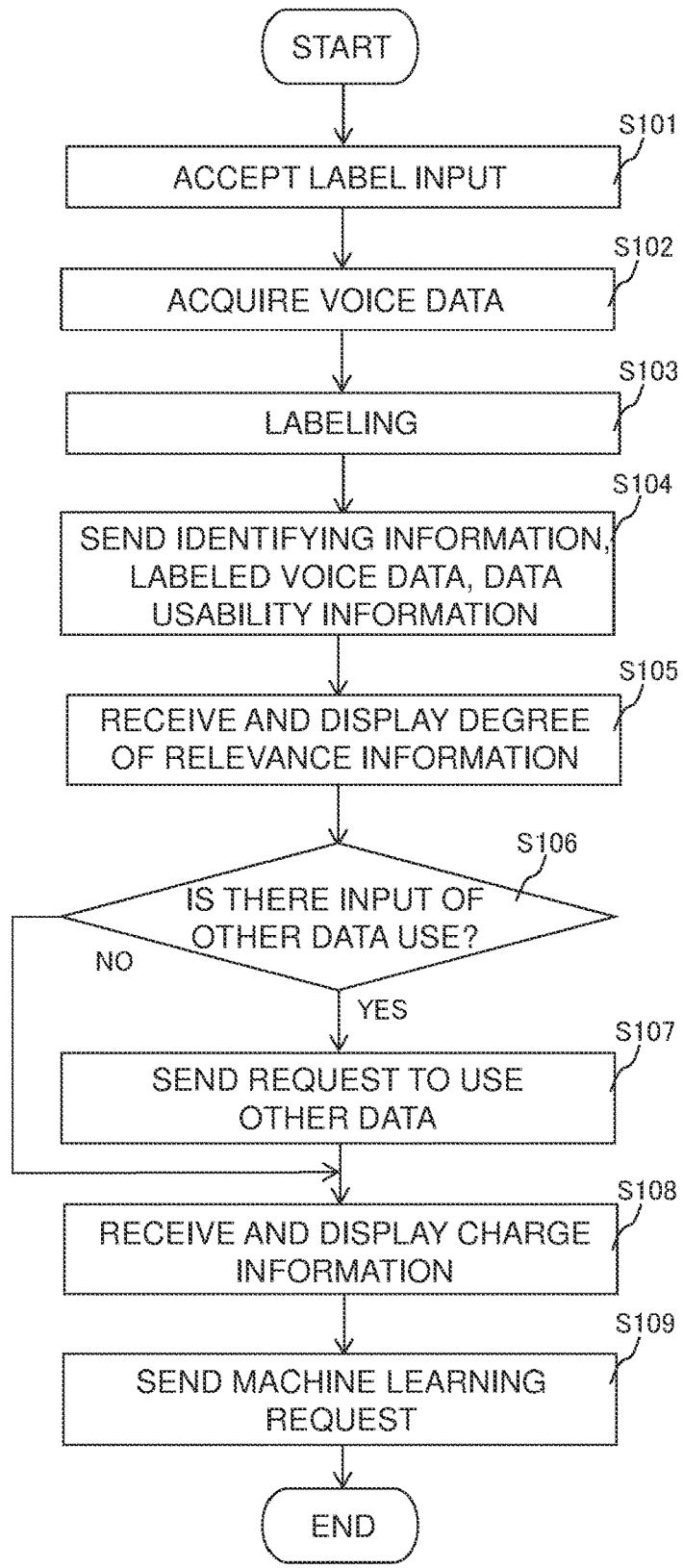
FIG. 5 is a flowchart of actions for machine learning performed by an AI control device.

FIG. 5 shows actions for executing the machine learning performed by the AI control device 10 shown in FIG. 2. The AI control device 10 accepts input of labels for voice data, which is input data (S101). At this time, the display unit 15 displays a display interface 15a such as is shown in FIG. 7. The display interface 15a (one example of a label input interface) includes an interface for inputting labels and an interface for inputting data usability information. The usability information indicates the allowing/disallowing of use of the voice data by other users. The user of the AI control device 10 inputs a label for the voice data of interest via the operation unit 16. For example, a label with the keyword "woman's scream" is inputted. The label may be directly inputted by the user, or may be made selectable for the user by displaying a list of labels set beforehand.

The voice data is acquired by the input data acquisition unit 111 (S102), and the label accepted in step S101 is assigned to the voice data by the labeling unit 112 (S103).

The control unit 11 sends the labeled voice data associated with the user-identifying information along with the data usability information to the server device 30 via the communication unit 17 (S104).

The degree of relevance information described above is received from the server device 30 and displayed on the display unit 15 (S105). For example, the display unit 15 displays a display interface 15b such as is shown in FIG. 8A. For the voice data in question, the display interface 15b displays the degree of relevance (%) of voice data of another user, and label names and numbers of samples of the other voice data. By selecting and inputting the voice data of the other user via the display interface 15b, the user in question sends a request to use the voice data of the other user to the server device 30.

The voice data of the other user, displayed as degree of relevance information, is limited to data that the other user allows in their usability information.

When input to use the voice data of the other user is accepted (Yes in S106), the control unit 11 sends a request to use the data of the selected other user to the server device 30 via the communication unit 17 (S107).

Charge information is received from the server device 30 and displayed on the display unit 15 (S108).

When voice data collected by another user is used (Yes in S106), the display unit 15 displays a display interface 15c such as is shown in FIG. 9. In addition to displaying a fee for using the current machine learning performed by the server device 30 (machine learning usage fee), the display interface 15c displays a fee to use the requested voice data of the other user.

When no voice data of another user is used (No in S106), i.e., when "start machine learning without using any data" is selected in the display interface 15b of FIG. 8A, the display unit 15 displays only the machine learning usage fee on the display unit 15 as charge information.

The user in question, via the display interface 15c, inputs whether or not to consent to the presented charge information. When consent is inputted, the control unit 11 requests to the server device 30 to start machine learning (S109).

In step S106, when no voice data of another user is used (No in S106), the display unit 15 need not display the charge information.

The sequence of steps S101-S103 is not limited to what is described above. Label input may be accepted and labeling may be executed after voice data is acquired.

1-2-2. Actions of Machine Learning Performed by Server Device 30

Figure 6:
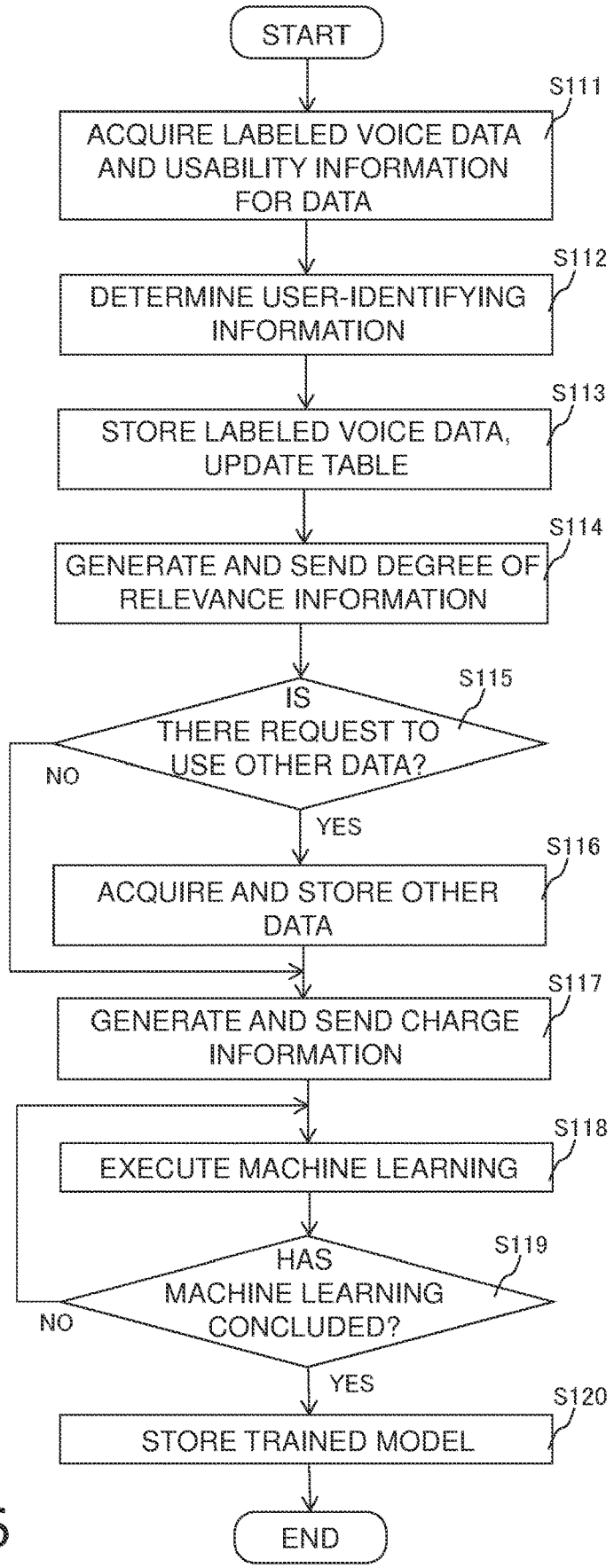
FIG. 6 is a flowchart of machine learning actions performed by a server device.

FIG. 6 shows the actions of the server device 30. The input data management unit 311 of the control unit 31 acquires the voice data and the usability information of the data received from the AI control device 10 (S111). The input data management unit 311 determines the received user-identifying information (S112), classifies and stores the received labeled voice data in the input data storage unit 334 for each label, and updates the user management table 331a shown in FIG. 4A (S113).

The input data management unit 311 generates the degree of relevance information described above and sends this information to the AI control device 10 corresponding to the user-identifying information (S114). When this happens, the input data management unit 311 also refers to the usability information of the voice data of the other user, and excludes degree of relevance information for the unusable voice data of the other user without generating such information.

Degree of relevance information is generated as follows. The input data management unit 311 compares the label of the labeled voice data from the user (referred to hereinafter as the subject label) and the labels of multiple pieces of voice data (other labels) classified and stored in the input data storage unit 334. The input data management unit 311 calculates degrees of relevance (%) that other labels have to the subject label on the basis of criteria such as is shown in FIG. 8B. The input data management unit 311 specifies voice data assigned a label that, among other labels, has a degree of relevance of a prescribed value or greater (e.g., 60% or greater). The input data management unit 311 extracts, from the input data storage unit 334, voice data of which the degree of relevance of the label is the prescribed value or greater, generates degree of relevance information including the voice data and the calculated degree of relevance, and sends the information to the AI control device 10.

When a request to use voice data of another user is received from the AI control device 10, which had referred to the degree of relevance information (Yes in S115), the voice data of the other user is acquired from the input data storage unit 334 (S116).

The input data management unit 311 generates charge information and sends the charge information to the AI control device 10 (S117). In step S117, the input data management unit 311, depending on whether the usability information acquired in step S111 indicates "usable" or "not usable" and also depending on whether or not there is a use request in step S115, refers to the charge table 332a to calculate a charge amount, and generates charge information indicating the amount. Referring to the charge table 332a shown in FIG. 4B, with the base being 100 yen, which is the basic fee to generate a trained model based on voice data assigned one label ("scream" in the example of the present embodiment), 50 yen is discounted when the usability information acquired in step S111 indicates "usable," and 50 yen is added when a use request is received in step S115 (Yes in S115); thus is the charge amount calculated.

Machine learning is executed by the learning unit 312 (S118). When voice data of another user is not used (No in S115), machine learning is executed on the basis of only voice data acquired from the user in question. As a result, a trained model is constructed which learns the characteristics of voice data acquired from the user in question and senses unknown sounds having the same characteristics. When voice data of another user is used (Yes in S115), machine learning is executed on the basis of voice data of the specified other user in addition to the voice data acquired from the user in question. As a result, a trained model is constructed which learns the characteristics of voice data acquired from the user in question and of voice data acquired from a specified other user and senses unknown sounds having the same characteristics.

When machine learning is ended (Yes in S119), the generated trained model is stored in the trained model storage unit 333 in correspondence with the identifying information of the user in question (S120).

The generated trained model is sent to the AI control device 10 of the corresponding user and is stored in the trained model storage unit 132 of the storage unit 13. The sending of the trained model from the server device 30 to the AI control device 10 may be performed automatically in response to the ending of machine learning, or may be performed in accordance with a request from the AI control device 10.

Figures 10, 11A:
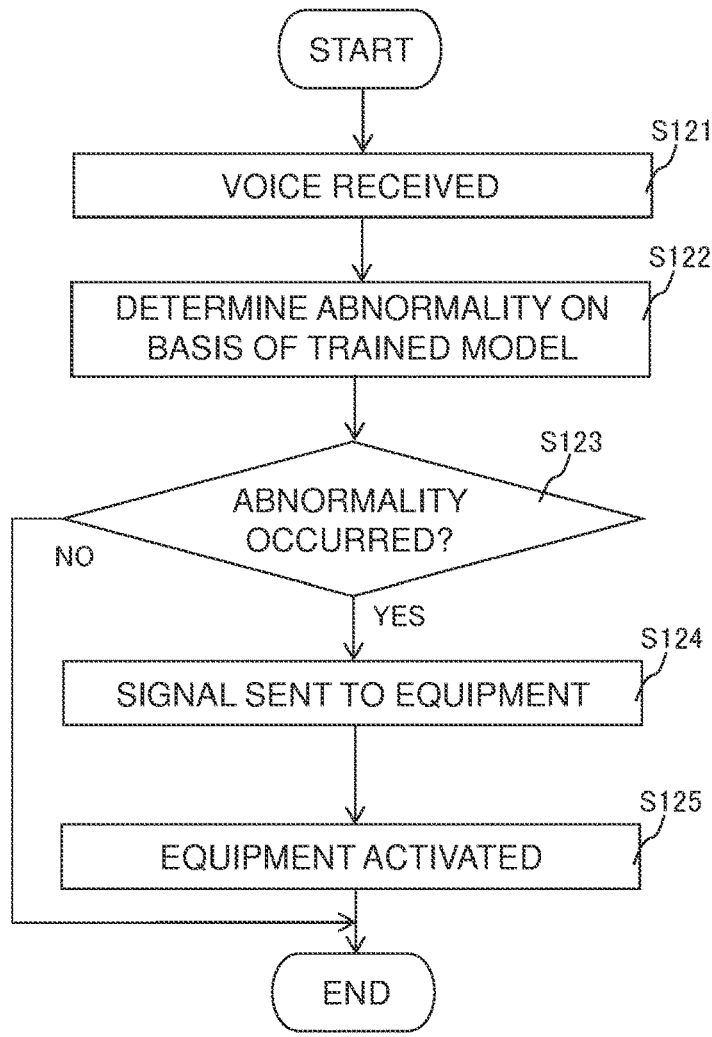
FIG. 10 is a flowchart of actions of abnormality detection performed by an AI control device.
FIG. 11A shows an example of position information of a microphone referenced by an AI control device according to another embodiment.

1-2-3. Abnormality Detection Action Performed by AI Control Device 10 The AI control device 10 performs abnormality detection using the trained model generated by the server 30. FIG. 10 shows the action of abnormality detection performed by the AI control device 10. The AI control device 10 receives a voice from the microphone 18 (S121).

The abnormality detection unit 113 of the control unit 11 of the AI control device 10 reads out and executes the trained model stored in the trained model storage unit 132, and determines whether or not the received voice has any abnormality on the basis of the trained model described above (S122). That is, the trained model determines that an abnormality has occurred (there is an abnormality) by detecting a voice having learned characteristics. This means that the user originally detects a voice corresponding to the label ("scream" in the present embodiment) assigned in steps S101-S103 of FIG. 5 and determines the abnormality. In the present embodiment, there is determined to be an abnormality (Yes in S123) when a voice corresponding to a scream is detected. The equipment activation command unit 114 sends a signal via the contact output unit 19 (S124) in accordance with the determination that there is an abnormality. As described above, when a plurality of microphones 18 are connected, the equipment activation command unit 114, via the contact output unit 19, sends a signal to the broadcasting devices 20 and/or surveillance cameras 40 corresponding to microphones 18 that received the voice determined to be abnormal (S124).

The specified equipment is activated by the equipment activation command unit 114 (S125). For example, the equipment is set to ON, a warning voice is outputted if the equipment is the broadcasting device 20, and video recording is started if the equipment is the surveillance camera 40.

The AI control device 10 may have a mode (machine learning mode) for executing actions for machine learning (steps S101-S109 in FIG. 5) and a mode (abnormality detection mode) for executing abnormality detection actions (steps S121-S125 of FIG. 10), and may switch between the modes and execute the respective actions. The microphone 18 functions in order to acquire labeled voice data during machine learning mode, and functions in order to acquire unknown sounds to detect abnormalities during abnormality detection mode. The AI control device 10 is configured so as to act in machine learning mode when a trained model has not been stored in the trained model storage unit 132, and to automatically switch to abnormality detection mode if a trained model has been stored in the trained model storage unit 132.

1-3. Characteristics, Etc.

The AI control device 10 according to the above Embodiment 1 acquires input data (e.g., voice data) and sends the input data to the server device 30 in association with identifying information capable of identifying the user of the AI control device 10. The AI control device 10 detects the occurrence of a prescribed event (e.g., a scream) due to the server device 30 executing a trained model that is generated separate from the trained models of other users and that learns the characteristics of the input data and detects input data having those characteristics from unknown input data. Therefore, the burden on the user can be reduced in the generation of a trained model, and a discretionary event detection means can be realized using a trained model.

The AI control device 10 according to the above Embodiment 1 causes the display unit 15 to display the display interface 15a for accepting label input, and assigns a label to input data in accordance with the label input. Therefore, the user can execute labeling on the input data in a simple manner.

The AI control device 10 according to the above embodiment causes the display unit 15 to display degree of relevance information that is calculated by the server device 30 and that indicates the degree of relevance between labeled input data and labeled input data of another user. Therefore, the user is able to selectively use another user's input data that has a high degree of relevance, and there is no need for a user to collect a large quantity of sample sounds and create labeled voice data. As such, the burden on the user can be further reduced in the generation of a trained model, and the accuracy of the trained model can be improved.

The server device 30 according to the above Embodiment 1 receives input data corresponding to identifying information of a plurality of users from the AI control devices 10 of the users, stores the received input data in the storage unit 33, uses the same input data to learn characteristics of input data for each user, generates a trained model that detects input data having the same characteristics from unknown input data, and causes the storage unit 33 to store the generated trained model by label. Therefore, input data can be shared among a plurality of users, the burden on the users can be further reduced in the generation of trained models, and the accuracy of the trained models can be improved.

The server device 30 according to the above Embodiment 1 stores usability information for the input data of the users in the storage unit 33, and manages the information. Therefore, the input data of users is restricted from being used by other users, and input data is therefore protected.

The AI control device 10 and the server device 30 according to the above Embodiment 1 present to the user a fee for when the user uses machine learning, on the basis of the usability information and charge information managed by the server device 30. The charge differs depending on whether or not the user has allowed their own input data to be used, or depending on the amount of use of input data of other users. Therefore, the user is given an incentive to allow their own input data to be used and to use the input data of other users, and the use of input data in the machine learning of users can be facilitated.

The AI control device 10 according to the above Embodiment 1 activates the connected broadcasting device 20 and/or surveillance camera 40 on the basis of abnormality detection using a trained model. Therefore, the AI control device 10 can have a multi-purpose configuration, and a user-friendly device can be realized.

1-4. Modifications

In the above example, machine learning is executed when input data is sent from the AI control device 10, but whether or not to execute machine learning may be decided after waiting for input from the user. For example, the user may enter input data multiple times and machine learning may be executed when a certain amount of data is obtained.

In the above example, equipment is activated when the AI control device 10 determines an abnormality, but this feature is not provided by way of limitation. For example, the AI control device 10 may issue a notification to a facility manager or a security room.

The AI control device 10 may be designed to be able to only use the data of another user without input data of the AI control device 10. For example, after a label input operation (S101 in FIG. 5) has been performed on the display interface 15a shown in FIG. 7, the AI control device 10 sends a request to use the data of another user to the server device 30 (S107). The display unit 15 displays charge information and information on the degree of relevance between the label inputted by the user of the AI control device 10 and labeled input data of the other user (S105 and S108). The user selects labeled input data of the other user on the basis of the degree of relevance information, and sends a machine learning request to the server device 30 when the charge is consented to (S109). The server device 30 executes machine learning for the user of the AI control device 10 on the basis of input data of the specified other user.

In the above example, data usability information is sent to the server device 30 along with labeled input data, but may be enabled to be sent separately. In addition, the user may be given the ability to change data usability information at any time by an input operation.

2. Other Embodiments

As described above, embodiments were described as examples of the technology disclosed in the present application. However, these embodiments are not provided by way of limitation on the technology of the present disclosure; said technology can also be applied to embodiments in which changes, substitutions, additions, omissions, etc., have been made as appropriate. The constituent elements described in the above embodiments can also be combined to create new embodiments.

(1) In Embodiment 1, the AI control device 10 activated the equipment by contact output via the contact output unit 19, but this feature is not provided by way of limitation. The AI control device 10 may activate the equipment via the communication unit 17.

In this case, the pieces of equipment each have a network connection unit having an IP address. When an abnormality has been determined, the equipment activation command unit 114 of the control unit 11 of the AI control device 10 shown in FIG. 1 generates a signal for activating equipment, sends the signal to the IP address of the equipment via the communication unit 17, and activates the equipment in the same manner as in Embodiment 1. Furthermore, as described above, when multiple pieces of equipment (broadcasting device 20, surveillance camera 40) and multiple microphones 18 corresponding to these pieces of equipment are installed in different areas, the microphones 18 may be adapted to IP and connected via the communication unit 17. In the case of such a configuration, position information of the microphones 18 and position information of the pieces of equipment may be registered, and equipment in the vicinity of a microphone 18 that acquired a voice determined to be abnormal may be activated. The AI control device 10 (storage unit 13) or a managing computer (not shown) connected to the AI control device 10 retains microphone information (FIG. 11A) that associates identifying information (IP address) of the microphones 18 and information on the positions where the microphones 18 are installed in the facility, and equipment information (FIGS. 11B, 11C) that associates identifying information of the equipment and information on the positions where the equipment is installed in the facility. When an abnormality is detected, the equipment activation command unit 114 refers to the information shown in FIG. 11A and specifies the position information of the microphones 18 that acquired the voice determined to be abnormal. The equipment activation command unit 114 furthermore specifies equipment near these microphones 18 from position information of the speakers shown in FIG. 11B and position information of the surveillance cameras shown in FIG. 11C, and sends signals to activate the equipment in the same manner as in Embodiment 1. For example, when there are a plurality of broadcasting devices 20 installed in a facility, the AI control device 10 refers to the position information shown in FIG. 11B, designates the IP addresses of one or a plurality of broadcasting devices 20 in the vicinity of microphones 18 that detected a sound determined to be a "scream," sends signals to turn these broadcasting devices 20 on, and causes a warning voice to be outputted.

(2) In Embodiment 1, voice data was given as an example of input data but is not given by way of limitation. For example, the input data may be image data. In this case, the AI control device 10 should be provided with a camera that acquires images instead of a microphone 18. Image data acquired from the surveillance camera 40 may also be used. In the case of image data, machine learning is executed using, as input data, image data of which the labels are desired by the user, e.g., keywords such as "suspicious actions," "actions in which people are fighting each other," and "a person has fallen down," and a trained model that learns characteristics of image data and detects images having these characteristics from unknown images (video) is generated. In addition, when an abnormality is detected from image data, turning equipment on and other activations (e.g., turning a broadcasting device 20 on, outputting a warning voice, starting image recording by the surveillance camera 40, etc.) are started, as in Embodiment 1.

(3) In Embodiment 1 and the above example, the input data management unit 311 of the server device 30 calculated a degree of relevance in accordance with a degree of similarity between label names of input data of a user, but this feature is not provided by way of limitation. A degree of similarity between pieces of input data may be calculated in addition to or instead of a degree of similarity between label names. For example, when the input data is voice data, a degree of similarity may be calculated in accordance with the closeness of numerical values of characteristic parameters of voice data, such as height of frequency and magnitude of amplitude. When the input data is image data, a degree of similarity in action patterns or posture patterns in the image may be calculated as a degree of relevance.

Furthermore, a degree of relevance may be calculated in consideration of factors such as a degree of similarity in business types between users and a degree of similarity in the types of facilities where the AI control devices 10 are used.

(4) In Embodiment 1 and the above example, the server device 30 may store, in advance, datasets (e.g., datasets provided by companies that provide AI platforms and machine learning services) acquired from sources other than users in the storage unit 33, and allow requesting users to use the datasets.

(5) In Embodiment 1 and the above example, the AI control devices 10 assign labels to input data due to users inputting labels, but this feature is not provided by way of limitation. The server device 30 may acquire unlabeled input data from the AI control devices 10, automatically analyze the input data, and assign labels.

(6) In Embodiment 1 and the above example, the AI control devices 10 are provided with both a function for machine learning and an abnormality detection function, but this feature is not provided by way of limitation. Machine learning may be executed with users labeling input data and sending input data to the server device 30 not through the AI control devices 10, but through other computer terminals. The AI control devices 10 may acquire trained models from the server device 30 and perform the abnormality detection action.

(7) In the present specification, detection of dangerous events is not a limitation on abnormality detection; abnormality detection can include any state or action that a user wants to detect, i.e., detection of a predetermined event.

(8) The control units 11, 31 of the AI control devices 10 and the server device 30 may include a processor configured from a dedicated electronic circuit designed so as to realize a predetermined function. The control units 11, 31 may also be realized using DSP, a FPGA, an ASIC, and other various processors. The processor may be configured from one or a plurality of processors.

(9) The execution sequences of the processes of the flowcharts shown in FIGS. 5, 6, and 10 are not necessarily limited to what is described in the above embodiment; the execution sequences can be, inter alia, changed or executed in parallel within a range that does not deviate from the scope of the invention. Furthermore, when a plurality of processes are included in one step, the plurality of processes included in the one step can be executed by one device or the execution can be shared by a plurality of devices.

(10) The range of the present disclosure includes a machine learning method and abnormality detection method executed by the AI control devices 10 and/or the server device 30, computer programs that execute said methods, and a computer-readable recording medium that stores said computer programs. The computer programs may be acquired via, inter alia, a telecommunications line, a wireless or wired communication line, or a network typified by the Internet.

(11) Part or all of the AI control device 10 and/or the server device 30 according to the present disclosure can have a cloud computing configuration in which one function is shared and processed jointly by a plurality of devices via a network. The present disclosure includes cases in which the term "device" means a set of a plurality of constituent elements (devices, modules (components), etc.), and it does not matter whether or not all of the constituent elements are in the same housing. In addition, all or some of the constituent elements may be installed in a location other than a facility.

REFERENCE SIGNS LIST

1: System
10: AI control device
11: Control unit
12: RAM
13: Storage unit
14: ROM
15: Display unit
15a-15c: Display interfaces
16: Operation unit
17: Communication unit
18: Microphone
20: Broadcasting device
30: Server device
31: Control unit
32: RAM
33: Storage unit
34: ROM
37: Communication unit
40: Surveillance camera 111: Input data acquisition unit
112: Labeling unit
113: Abnormality detection unit
114: Equipment activation command unit
131: Identifying information storage unit
132: Trained model storage unit
311: Input data management unit
312: Learning unit
331: User management table storage unit
331a: User management table
332: Charge table storage unit
332a: Charge table
333: Trained model storage unit
334: Input data storage unit

The invention claimed is:

1. A server device connectable to a plurality of AI control devices used by a plurality of users, the server device comprising:
a second control unit;
a second communication unit connected to the plurality of AI control devices; and
a second storage unit,
wherein the second control unit
receives input data associated with information that identifies the users from the AI control devices of the plurality of users via the second communication unit, stores the received input data in the second storage unit, uses the received input data to learn characteristics of the received input data for each user and generates a trained model that detects input data having the characteristics from unknown input data, and
causes the second storage unit to store a generated trained model for each user,
wherein the received input data is labeled input data assigned a label inputted by a user who is a sender of the received input data, and
wherein the second control unit
causes the second storage unit to store the labeled input data in accordance with the label, and
in response to receiving the labeled input data from a first user, generates the trained model using the received labeled input data and input data that is assigned a similar label having a degree of relevance of a predetermined value or greater with the label of the labeled input data received from the first user, and that had been received previously from a user other than the first user and stored in the second storage unit.

2. The server device according to claim 1, wherein
the labeled input data includes usability information that is inputted by the user who is the sender of the labeled input data and that indicates whether or not the labeled input data is usable by another user, and
the second control unit generates the trained model using labeled input data that, among labeled input data previously received from a user other than the first user and stored in the second storage unit, includes affirmative usability information.

3. The server device according to claim 2, wherein
the second storage unit retains a charge table including a unit price for generating a trained model using labeled input data of the first user, a unit price needed to use labeled input data of the other user, and a unit price decided in accordance with the usability indicated by the usability information, and
the second control unit, along with generating the trained model according to the labeled input data received from the first user, refers to the charge table to calculate an amount to be charged to the first user, and sends the amount to an AI control device of the first user via the second communication unit.

4. The server device according to claim 1, wherein
the second storage unit retains a charge table including a unit price for generating a trained model using labeled input data of the first user and a unit price needed to use labeled input data of the other user, and
the second control unit, along with generating the trained model according to the labeled input data received from the first user, refers to the charge table to calculate an amount to be charged to the first user, and sends the amount to an AI control device of the first user via the second communication unit.

5. A server device connectable to a plurality of AI control devices used by a plurality of users, the server device comprising:
a second control unit;
a second communication unit connected to the plurality of AI control devices; and
a second storage unit,
wherein the second control unit
receives input data associated with information that identifies the users from the AI control devices of the plurality of users via the second communication unit, stores the received input data in the second storage unit, uses the received input data to learn characteristics of the received input data for each user and generate a trained model that detects input data having the characteristics from unknown input data, and
causes the second storage unit to store a generated trained model for each user,
wherein the received input data is labeled input data assigned a label inputted by a user who is a sender of the received input data, and
wherein the second control unit
causes the second storage unit to store the labeled input data in accordance with the label,
in response to receiving the labeled input data from a first user, specifies input data that is assigned a similar label having a degree of relevance of a predetermined value or greater with the label of the labeled input data received from the first user, and that had been received previously from a user other than the first user and stored in the second storage unit, and presents degree of relevance information indicating the labeled input data of the other user on the AI control device of the first user via the second communication unit, and
in response to a request received via the second communication unit from the AI control device of the first user who was presented with the degree of relevance information, selectively either generates a trained model using the labeled input data received from the first user or generates a trained model using the labeled input data received from the first user and labeled input data of the other user indicated by the degree of relevance information.

6. The server device according to claim 5, wherein
the labeled input data includes usability information that is inputted by the user who is the sender of the labeled input data and that indicates whether or not the labeled input data is usable by another user, and
the second control unit generates the trained model using only labeled input data that, among labeled input data of a user other than the first user indicated by the degree of relevance information, includes affirmative usability information.

7. The server device according to claim 6, wherein the second storage unit retains a charge table including a unit price for generating a trained model using labeled input data of the first user, a unit price needed to use labeled input data of the other user, and a unit price decided in accordance with the usability indicated by the usability information, and the second control unit, along with generating the trained model according to the labeled input data received from the first user, refers to the charge table to calculate an amount to be charged to the first user, and sends the amount to an AI control device of the first user via the second communication unit.

8. The server device according to claim 5, wherein the second storage unit retains a charge table including a unit price for generating a trained model using labeled input data of the first user and a unit price needed to use labeled input data of the other user, and the second control unit, along with generating the trained model according to the labeled input data received from the first user, refers to the charge table to calculate an amount to be charged to the first user, and sends the amount to an AI control device of the first user via the second communication unit.

\* \* \* \* \*